United States Patent [19]

Kobee

[11] 4,005,962
[45] Feb. 1, 1977

[54] EXTRUDER FOR PLASTIC MATERIALS

[76] Inventor: Frank R. Kobee, 1839 Macomber St., Toledo, Ohio 43606

[22] Filed: Dec. 4, 1974

[21] Appl. No.: 529,271

[52] U.S. Cl. .............................. 425/197; 425/224; 425/379 R; 425/382 R

[51] Int. Cl.[2] ......................................... B29F 3/08

[58] Field of Search ........ 264/176 F, 176 R, 177 F, 264/177 R; 425/224, 378, 379, 380, 381, 382, 464, 467, 455, 449, 66, 113, 114, 447, 197, 199, 198, 466, 145; 156/500, 501, 244

[56] References Cited

UNITED STATES PATENTS

| 2,408,713 | 10/1946 | Webb | 425/464 X |
| 2,565,941 | 8/1951 | Barnard | 425/145 X |
| 3,249,468 | 5/1966 | Von Drachenfels | 425/455 X |
| 3,399,426 | 9/1968 | Weasel, Jr. | 425/379 X |
| 3,554,449 | 1/1971 | Currie | 425/113 X |
| 3,632,282 | 1/1972 | Rasmussen | 425/464 |
| 3,864,066 | 2/1975 | Gerhardt | 425/224 X |
| 3,887,322 | 6/1975 | Johnson et al. | 425/466 |

FOREIGN PATENTS OR APPLICATIONS 29,595  2/1965  Germany ........................ 425/382

Primary Examiner—Richard B. Lazarus
Assistant Examiner—Mark Rosenbaum
Attorney, Agent, or Firm—George R. Royer

[57] ABSTRACT

An extruding machine for the extrusion of plastic or other similar materials in variegated forms comprising a series of bar members spaced from one another, wherein said bar members form by their interstitial spaces the extrusion chambers; said bar members having heating elements integrally disposed therein for the purpose of heating, to an amorphous state, the plastic material placed on and contacting the upper surface of said bars for extrusion into a receptacle beneath the bars.

3 Claims, 4 Drawing Figures

EXTRUDER FOR PLASTIC MATERIALS

BACKGROUND OF THE PRIOR ART

The plastic extrusion art has developed into a complex mechanical and chemical science; and consequently the relative expense in operations thereof have become an onerous burden. The complexities of the machinery involved are generally matched significantly in direct proportion to the energy requirement involved. In addition to the problems of encountering relatively complex machinery in the extrusion art, there is a vast deficiency in existing extrusion equipment to handle the problem of extruding variegated plastic waste products and used plastic materials so as to be able to recycle such materials back into a usable raw material form for further processing. The following discussion of the background of the prior art set forth below will entail a discussion of these problems as they relate to the general objects and purposes for which the subject invention has been conceived.

The conventional plastic extruder is basically comprised of a supportive frame member; a hopper which functions to feed the raw plastic material into the extruder unit; a cylindrical barrel member containing a screw device serving to both mix the plastic and move the plastic product to the extruder outlet; power means to drive the screw element; heating means to heat the plastic material in the barrel; and means at the end of the barrel to serve as the extrusion outlet. Each of these elements, as will be discussed, yield special cost, operational, and rigidity of usage problems in the extruding process, which do not yield the desired mechanical flexibility in handling the problem of extruding many different forms of plastic materials.

The supportive frame member in either a vertical or horizontal extruder is usually a cast iron member. Its size and strength will obviously depend largely on the complexity and amount of equipment appended to the basic extrusion unit. As in other areas of machinery usage, the usage of lighter and less complex extrusion equipment would yield the need for less bulky frame members. Thus, any conception in the extrusion art which results in lighter extrusion equipment requires also a lighter frame member thus reducing initial capital outlays.

The feed element in the conventional extrusion machine is most usually a simplistic sheet metal enclosure adapted to vertically feed the raw plastic into the barrel member. Frequently, the orifice of the feed element leading to the extrusion barrel is relatively small, although not in all cases. When this latter situation is encountered there is a relatively larger heat requirement in order to move the plastic through the orifice into the barrel. In some instances this latter difficulty is alleviated by providing the feed element with a self contained heater unit which serves to preheat the plastic material before it enters the barrel member. Moreover, in some polymer extrusion processes, individual polymer batches are preheated separately before being fed into the barrel member. More recently, the feed hopper element has also been equipped with drying units that circulate dehumidified air in order to prepare the plastic for optimal processing and reduce thereby initial heating requirements.

It is obvious from the foregoing, at least to one who has had some familiarity with the plastic extrusion art that any such complexity in the feeder unit or its operation causes higher operational and capital costs in the extrusion process. In this consideration, it is important, and indeed critical, not to overlook one of the most essential steps in the extrusion process, that is the need to render the plastic pliable into a semi-molten amorphous state in order that it may be readily worked and extruded at a sufficiently warm, but not too high, temperature at the extrusion outlet. Any solution to the problem within this necessary parameter of of delivering the plastic material to the extrusion outlet in the optimal state, which concurrently requires a minimal amount of heat or energy, would obviously produce operational efficiencies which by itself would yield inventive distinction over the prior art. Specifically, the saving of energy is a particularly significant criteria in ascertaining one of the steps of inventiveness.

As mentioned above, the core of the conventional extruder machine is the barrel member which encases a stoker-like screw member serving to both churn the amorphous plastic and move it to the end of the extruder for the final extrusion process. The usual extruder barrel length varies from twenty to thirty times its diameter, and obviously such sizes cause relative inefficiency in operational performance.

In addition, because of the high internal pressures encountered in an extruder barrel, e.g. 50 to 400 atmospheres, it is essential that the barrel be constructed of a heavy steel material. Thus, one can see that large quantities of metal are required in the usual barrel construction. Yet another peripheral requirement of the extreme barrel pressures is that the barrel member must be appropriately vented along the length, leading to inefficient heat losses. In the more complex extruders the plastic is softened and melted in the barrel member to a more pliable state. As part of this first stage the plastic is mixed, and then immediately passed into a channeled zone open to the atmosphere or a vacuum in order to vent the hot gases produced. Thereupon the plastic is then moved to a second stage and ultimately delivered to the extrusion outlet to form the final product.

Thus, as can be seen above, all the extrusion units require a method of heating the plastic as it moves through the barrel, but with such venting of hot gases heat losses become considerable. Most such units are electrically heated to temperatures in the range of 300 degrees centigrade. One of the more frequently encountered heaters of the latter type are band-type electrical resistor heaters situated circumferentially around the barrel. Others utilize an induction heating process as a means of heating the plastic. Moreover, contemporary extrusion units are constructed to capitalize on the heat generated by the internal friction of the plastic to supplement the extreme heat input. In the more complex extrusion equipment, a cooling system such as the venting system discussed above, must be utilized because of the heat produced by the high speed of the extrusion equipment. The difficulty with the presence of the higher degree of heat is that within higher temperature ranges there is risk that the polymer may suffer degradation. This overview of the barrel function of a conventional extruder reveals inherent operational inefficiencies, particularly from the aspect of energy usage. Furthermore, it is readily ascertainable that the rigidity of the barrel structure restricts the types, quantities, and compositional makeup of the plastic material to be extruded. More specifically, an extruder of conventional cast is usually structurally limited to handle only one type of plastic material.

It is this dual problem of energy usage inefficiency and the limited adaptability of conventional extrusion equipment to which this invention is directed. More specifically, this invention has been produced to overcome the high energy requirements that are encountered in the operation of a conventional extruder, whether of the blow molding or injection molding type. As previously discussed, in this area of energy shortages, such projected goals are of significant importance to society at large. It is most important that utilization be made of manufacturing processes that use efficient machinery. Another disadvantage of the conventional extrusion machinery discussed above, is that such machines are generally adapted only to extrude raw plastic of only one type or composition. With today's emphasis on saving and recycling waste materials back into usable products, need has arisen for means to mold plastic materials of variegated forms into usable raw material for further processing back into final products. In particular, many waste products that arrive at a processing facility exist and are contained in such various forms that a standard extrusion machine is incapable of handling a variety of different forms and compositions of plastic. Most such standard extruders are adapted to extrude a plastic substance of uniform composition without impurities for molding into a final product. This invention is thus a device capable of handling variegated plastic waste products so that they can be extruded into a fairly uniform and impurity-free plastic material that can be used for further processing into final products, which may require further extrusion into a final product. This invention is thus in essence a pre-extrusion processor.

Therefore, the objects of this invention are as follows:

It is an object of this invention to provide an improved plastic extrusion machine;

It is a further object of this invention to provide a plastic extrusion machine which uses relatively little energy and heat in its operation;

Still another object of this invention is to provide an improved machine for converting and eventually extruding large and miscellaneous chunks of plastic which are of variable size, variable density, and bulkiness;

It is still another object of this invention to provide a more efficient plastic extrusion machine;

Yet another object of the invention is to provide an improved plastic extrusion process;

It is also an object of this invention to provide a versatile and flexible plastic conversion and extruding machine;

Still another object of this invention is to provide an extrusion machine using gravitational forces to aid the extrusion process;

Another object of this invention is to provide a plastic extrusion machine capable of facilitating the recycling of waste or used plastic materials into usable form.

Another object of this invention is to provide an extrusion machine which is capable of extruding plastic materials of various sizes and shapes into continuous strands for further usage.

Other and further objects of the invention will become obvious from the following drawings taken in conjunction with the written description.

DESCRIPTION OF THE GENERAL EMBODIMENT

Figure 1:
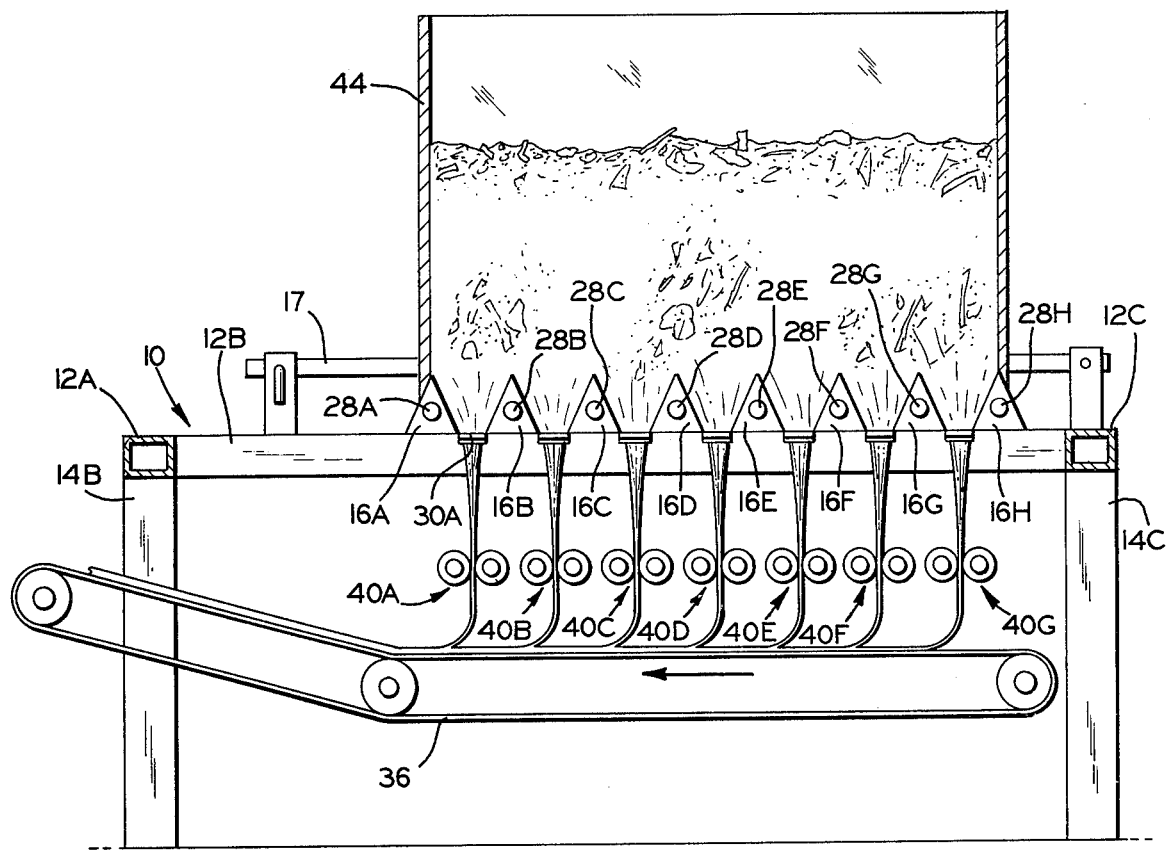
FIG. 1 is a side elevational view partially in section, of the subject invention.

The subject invention is an extrusion machine adapted for extrusion of variegated plastic materials, employing a chemical-mechanical process requiring relatively small heat quantities, said machine being capable of extruding a variety of sizes and shapes of polymer materials. The invention is comprised of a rectangular base support member, with the extrusion and heater element being comprised in turn of a plurality of internally heated longitudinally disposed bar units disposed in a grill-like arrangement, and a receptacle-hopper structure comprising the third basic unit serving to receive the extruded material and transport it to another work station.

The base support is structured similar to a simple retangularly shaped table member, and is thusly constructed to support on its upper supportive surface the basic extrusion elements. However, the upper portion of said base support member is simply a four sided member being comprised of four peripheral arms disposed and connected to one another in the arrangement of a rectangle's perimeter, there being no continuous planar surface over said upper surface.

As briefly stated above, the extrusion element itself is comprised of a plurality of longitudinally disposed bar members disposed lengthwise over the upper part of the base member. These longitudinal bar members are juxtaposed together. Consequently there is interstitial spacing between the respective bar members, with such juxtapositioning forming thereby a grill-like extrusion matrix. This latter spacing may vary in distance, shape, form, relative symmetry, and consistency, with the exact or particular spacing relationship made dependent on the exact size and shape desired for the materials leaving the extrusion outlet. In the most flexible embodiment of the subject invention it is practical to allow for arbitrary rearrangement of the longitudinal bar members at desired intervals as circumstances dictate.

It is generally desirable that each longitudinally disposed bar member possess the same cross-sectional configuration and symmetrical interstitial spacing for the most desirable uniformity in extrusion shapes. This uniform configuration is not absolutely necessary, however. In this respect, the most successful results have been obtained utilizing a triangular cross-sectional configuration, with a pointed apex extending vertically upwardly, with each side depending downwardly therefrom in a sloping manner, Extending throughout the longitudinal extent of each bar member are internally disposed heating elements, designed to generate, carry, and radiate heat to the outer peripheral surface of each bar member. These heat generating elements can be adapted to be actuated by electrical, steam, or other similar sources of heat.

Situated immediately beneath both the extrusion element and the upper supportive surface of the base support member is a receptacle member structured to both receive and transport the extruded material to another work location. This is generally a rectangular hopper having a conveyor therein for the transportation function.

In using the subject invention, the plastic materials to be extruded are placed on top of the longitudinal bar members. Thereupon the surfaces of the downwardly sloping sides of the longitudinal bar members contact the adjacent positions of the plastic material, heating its closest surfaces, and as the plastic materials are so heated, the portion becoming amorphous and semi-liquid runs vertically downwardly between the interstitial spaces between the longitudinal bar members. As portions of the plastic material become semi-liquid they run down the one sloping face of the bar member and at the approximate bottom of the face this molten mass will fuse with the comparable molten mass coming from the adjacent sloping face of the neighboring longitudinal bar member. These two molten masses fusing as described create a downwardly flowing unitized strand of amorphous plastic material as the final extruded material. This resultant effect of unitizing the downwardly flowing molten masses is dependent on the spacing between respective bars to be limited. The foregoing method of extrusion gives the flexibility of extruding materials at about one third the energy costs with the added feature of flexibility and more adaptability to achieve various shapes.

By such an inventive process, plastic by-product materials can, as a preliminary step, be recycled back into useful raw materials which then can be further extruded or processed into final specific plastic products. Plastic waste materials of all shapes, colors, and sizes thus can be brought together and recycled by this extrusion process into a workable raw material of substantial consistency and purity.

DESCRIPTION OF THE PREFERRED EMBODIMENT

Figure 3:
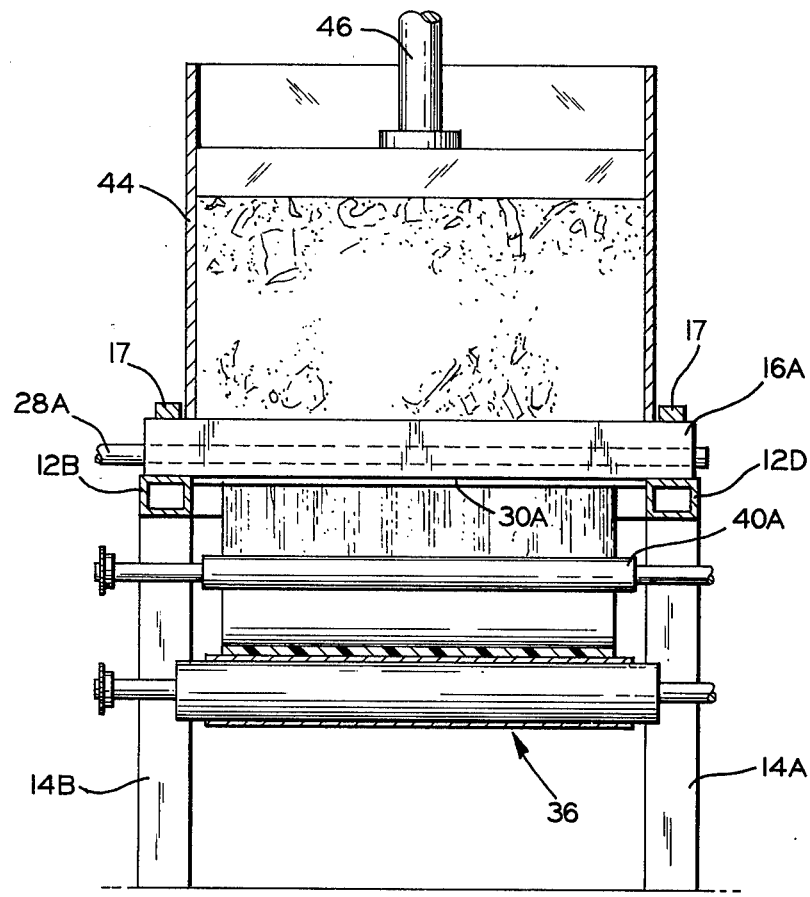
FIG. 3 is an elevational view, partially in cross section in detail showing in detail the subject invention element.

Referring now to the drawings in which a preferred embodiment of the subject invention is shown, a base support member 10 is shown. This base support member is basically structured as a conventional rectangularly shaped table structure having horizontally disposed and longitudinally extending support members 12A, 12B, 12C and 12D forming the perimeter of a rectangular structure as the upper support surface of the base member. The space between these longitudinal members 12A, 12B, 12C and 12D is open, being the only variation from conventional table surfaces. As shown in FIGS. 1 and 3, supporting legs 14A, 14B, 14C and 14D depend vertically from the respective corner junctures of the four longitudinal support members 12A, 12B, 12C, and 12D for holding the upper surface of table 10 off the floor.

Figure 2:
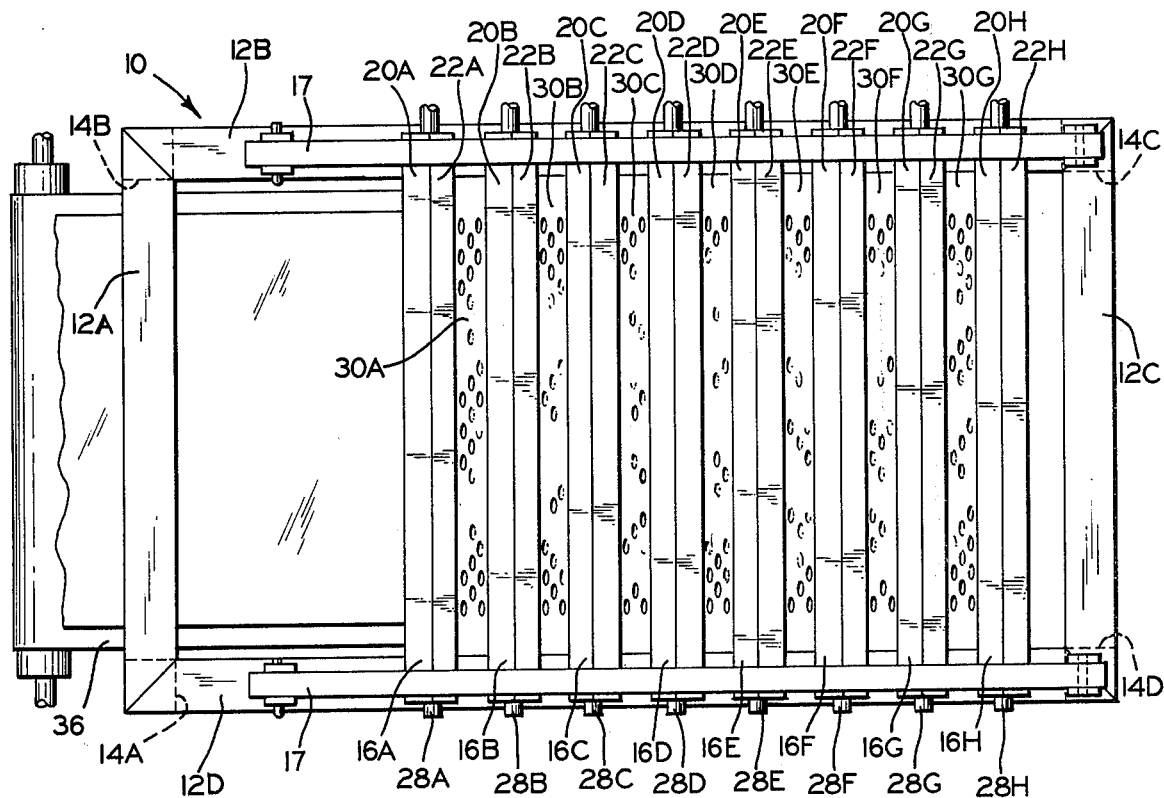
FIG. 2 is a top elevational view of the subject invention.

The extrusion heating element is composed of a plurality of longitudinally extending heating bar members 16A, 16B, 16C, 16D, 16E, 16F, 16G and 16H, which are disposed in mutually parallel fashion over the upper surface of support member 10 as shown in FIGS. 1 and 2. In particular, longitudinal heating bar members 16A, 16B, 16C, 16D, 16E, 16F, 16G and 16H are disposed so that the ends thereof rest on support members 12B and 12D respectively, as represented in FIG. 2. A hinged locking bar member 17, capable of being lifted vertically upwardly and alternately clamped downwardly over the upper portions of longitudinal bar members serves to lock the longitudinal heating bar members 16A, 16B, 16C, 16D, 16E, 16F, 16G and 16H into the desired spacing relationship. Thus, if the user desires to space the bars at a wider or narrower distance from one another, the bar 17 is lifted, the heating bars 16A, 16B, 16C, 16D, 16E, 16F, 16G and 16H are then moved about to the desired spacing and then locking bar 17 is lowered and locked. More particularly, longitudinal heating bar members 16A, 16B, 16C, 16D, 16E, 16F, 16G and 16H are preferably spaced equidistance from one another so as to form a symmetrical matrix of parallel members as represented in FIG. 2. The exact number and spacing of the heating bar members, however, is dependent on the size and character of extruding operation desired, as explained below.

Each longitudinal heating bar 16A, 16B, 16C, 16D, 16E, 16F, 16G and 16H is preferably triangular in cross sectional configuration. More specifically, the most preferable and desirable cross sectional configuration of each heating bar 16A, 16B, 16C, 16d, 16E, 16F, 16G, and 16H is that of an isosceles triangle. In viewing the heating bar in cross section, there is an upwardly projecting apex 18A, 18B, 18C, 18D, 18E, 18F, 18G and 18H for each such bar. Immediately adjacent to each such apex 18A, 18B, 18C, 18D, 18E, 18F, 18G and 18H are two downwardly sloping sides 20A, 20B, 20C, 20D, 20E, 20F, 20G and 20H and 22A, 22B, 22C, 22D, 22E, 22F, 22G and 22H. Each face forms the respective opposite side of the triangle. The lower base leg of the triangular configuration is defined by the side 24A, 24B, 24C, 24D, 24E, 24F, 24G and 24H. When the lower leg 24A, 24B, 24C, 24D, 24E, 24F, 24G and 24H of this triangle is positioned on the upper surface of base support member 10, it is flush and parallel with the horizontal plane defined by the uppermost supportive surface of base member 10. In such positioning the apex 18 projects directly vertically upwardly. In addition, as a direct result of this positioning of the triangular members the respective upper sides 20A, 20B, 20C, 20D, 20E, 20F, 20G and 20H and 22A, 22B, 22C, 22D, 22E, 22F, 22G, and 22H of the triangle configuration of each such heating bar 16A, 16B, 16C, 16D, 16E, 16F, 16G and 16H depends downwardly from apex 18A, 18B, 18C, 18D, 18E, 18F, 18G and 18H in a sloping manner, at an angle preferably 45°. This angle can be varied by using different bar configurations, and for more viscous material would require less of a slope of such sides, while the converse would be true for less viscous material. More particularly, when the plastic material to be extruded is thicker, the sides 20A, 20B, 20C, 20D, 20E, 20F, 20G and 20H and 22A, 22B, 22C, 22D, 22E, 22F, 22G and 22H should be inclined more towards the vertical, while the more free flowing the material would indicate sides that slant less drastically.

As an alternative to the triangular cross sectional configuration for the heating bars 16A, 16B, 16C, 16D, 16E, 16F, 16G and 16H any cross sectional configuration can be utilized so long as the heating bars are spaced from one another in some fashion to allow the extended semi-molten material to run down therebetween to be collected in some manner. Thus, the concept of this invention is not limited to any specific cross sectional configuration of the bar member, however a triangular cross section as discussed above is preferable for the optimum extrusion effect which will be elaborated in more detail.

Located within each bar member 16A, 16B, 16C, 16D, 16E, 16F, 16G and 16H is a longitudinally extending electrical resistor heating element 28A, 28B, 28C, 28D, 28E, 28F, 28G and 28H. These latter heating elements are preferably circular in cross sectional configuration in order to maximize the heat radiation therefrom to the outer faces 20A, 20B, 20C, 20D, 20E, 20F, 20G and 20H and 22A, 22B, 22C, 22D, 22E, 22F, 22G and 22H of the heating bar members 16A, 16B, 16C, 16D, 16E, 16F, 16G, 16H. Thusly heated, each face of the heating bar member, and particularly faces 20A, 20B, 20C, 20D, 20E, 20F, 20G and 20H and faces 22A, 22B, 22C, 22D, 22E, 22F, 22G and 22H serve as the sole heating contact with the plastic materials to be heated and extruded. Each heating element 28A, 28B, 28C, 28D, 28E, 28F and 28G and 28H is appropriately electrically energized at an appropriate end in order to transport the required electrical energy therethrough. Heating elements 28A, 28B, 28C, 28D, 28E, 28F, 28G and 28H can be energized by other suitable electrical means, or by steam, or other appropriate means.

Each bar member is preferably spaced approximately one and one-half inches from each other, however, this spacing can be adjusted to accommodate the varying viscosity or desired shape of extruded materials. The optimal spacing distance set forth is determined on a case by case basis for the type of materials to be extruded. One prime consideration is the desired refusion of the amorphous materials running downwardly through the elements as heated. Also, the desirable spacing between the heating bars 16A, 16B, 16C, 16D, 16E, 16F, 16G and 16H depends on the width of the strand of extruded material desired in the extrusion process. The result of the described mutually parallel disposition, with equal interval spacing between the heating bar members, is a plurality of mutually parallel, longitudinally extending extrusion outlets, which are adapted to allow the plastic material to be rendered semi-molten by the heated contact and extruded downwardly into a receptacle. This heating and extrusion process is described in more detail below.

Figure 4:
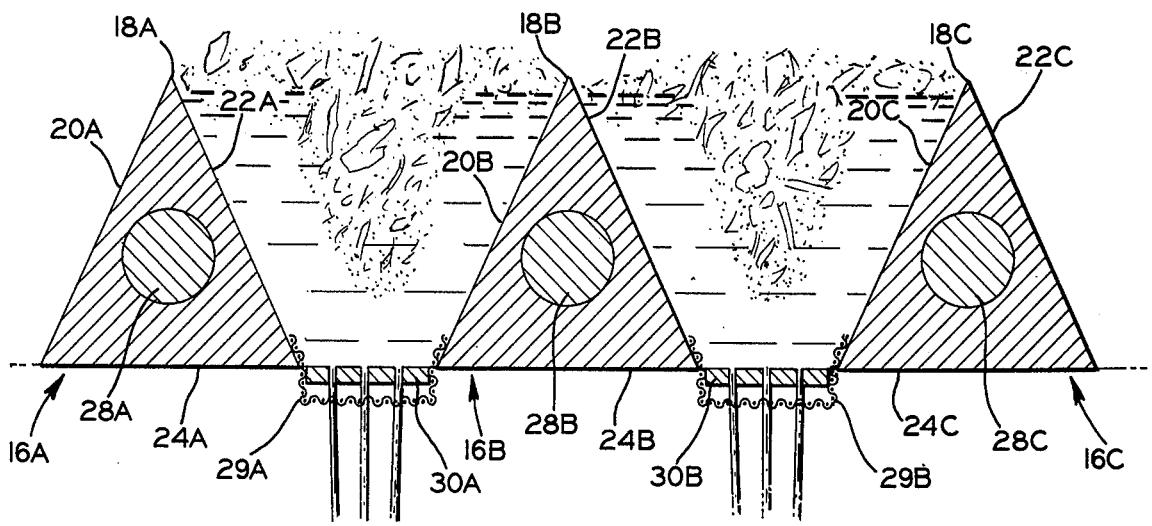
FIG. 4 is an end elevational view in section of the heated bar elements.

One or more layers of wire screen 29A, 29B, 29C, 29D, 29E, 29F, 29G and 29H are disposed at the bottom area of the longitudinally disposed openings formed between bar members 16A, 16B, 16C, 16D, 16D, 16E, 16F, 16G and 16H. These wire screens are shaped in a longitudinally elongated manner to conform to the extrusion openings formed between the respective bar members, as described above. The primary functions of these screens is to filter out impurities in the extruded material and to aid in the production of a more uniformly composed product. These screens 29A, 29B, 29C, 29D, 29E, 29F, 29G and 29H are preferably channel-shaped in cross sectional configuration as represented in FIG. 4.

Juxtaposed over the upper facing surface of the wire screen members 29A, 29B, 29C, 29D, 29E, 29F, 29G and 29H is a perforated, longitudinally extending plate member 30A, 30B, 30C, 30D, 30E, 30F, 30G and 30H extending also in the length of the open spaces between the heating bar members 16A, 16B, 16C, 16D, 16E, 16F, 16G and 16H. This perforated plate member serves to convert or translate the free flowing extruding material into downwardly flowing circular-in-cross section strands of amorphous materials which in such shape are in more usable form for transporting and processing. Both the screen members 29A, 29B, 29C, 29D, 29E, 29F, 29G and 29H and the perforated plate members 30A, 30B, 30C, 30D, 30E, 30F and 30G are optional appendages which help produce an extruded product of finer quality.

Situated immediately beneath the upper surface of support member 10 and the extrusion elements 16A, 16B, 16C, 16D, 16E, 16F, 16G and 16H is a conveyor belt 36 structured to convey the strips of extruded material away from the extrusion machine unit. A plurality of paired rollers 40A, 40B, 40C, 40D, 40E, 40F and 40G as shown in FIG. 1, are juxtaposed immediately vertically below the respective perforated plate members 30A, 30B, 30C, 30D, 30E, 30F and 30G. These respective pairs of rollers serve to receive the strands of extruded plastic falling from the spacing between the heating bar members immediately thereabove. Each pair of rollers squeeze the extruded plastic material into a thinner ribbon of material before it falls upon the conveyor 26.

As an optional addition, a box-shaped hopper 44 is placed immediately above the extrusion elements 16A, 16B, 16C, 16D, 16E, 16F, 16G and 16H as represented in FIG. 1. This hopper serves to hold the plastic materials in a containerized unit before it is to be extruded. Irrespective of whether the plastic material is stored in such a hopper 44 or is simply disposed in the open right above the heating bar members, its weight, and thus the gravitational force thereof can be used as a feed force to impress the plastic material down on the top surfaces of the heating bar members so that surfaces of the plastic nearest the heating bar members can be heated and melted so as to run downwardly between the respective spaces between the heating bar members.

Alternately, the plastic can be pressurized downwardly by a vertically disposed plunger 46 situated over the plastic material as shown in FIG. 3. One aspect that is noteworthy is that the more heat that is generated on the plastic material, the less pressure is proportionally required to force the plastic material downward on the heating bar members. In this alternate embodiment, a vertically depending piston 46 as shown in FIG. 3, can be used primarily to force the plastic material downwardly into pressurized contact with the upper surfaces of the extrusion element, further adding to the gravitational force effect described above.

The subject extrusion machine is utilized and operates as follows:

A block or loose bale of used plastic material is placed on top of the heating bars 16A, 16B, 16C, 16D, 16E, 16F, 16G and 16H, and inside the hopper 44, if added to the unit. Because of the gravitational force of the weight of the plastic material and the resultant pressurized contact between the heating bar members 16A, 16B, 16C, 16D, 16E, 16F, 16G and 16H and the juxtaposed contacting surfaces of the plastic material, the contacted surface areas of the plastic material will become sufficiently heated and thus sufficiently amorphous and viscous to begin breaking loose and running downwardly along the respective opposing faces of the heating bar members. For example, the heated plastic between the heating bar members 16A and 16B will run downwardly along face 22A and 20B respectively. Thereupon the semi-liquid plastic material flowing down face 22A will merge and fuse with the semi-liquid mass of plastic flowing down side 20B, so as to form a fuse flow of downwardly flowing plastic at the bottom area of the space between heating bar members 16A and 16B respectively. This process is similarly repeated for the plastic materials between the other respectively paired heating bar members. Thus the heated plastic will flow downwardly through the interstitial spaces defined between the respective heating bar members 16A, 16B, 16C, 16D, 16E, 16F, 16G and 16H such that the strips of plastic extruded material will correspond in shape to the shapes of the respective spaces defined between the heating bar members. These sheets of extruded plastic material will flow downwardly between the positioned paired rollers 40A, 40B, 40C, 40D, 40E, 40F and 40G. These rollers are structured to squeeze the extruded plastic material into a thinner sheet before it falls upon the conveyor.

The tendency of thermoplastic material to be rendered relatively molten on the surface of the respective heating bar member bearing part of the weight of the plastic load, coupled with the radiated heating effect of the heating bar members 16A, 16B, 16C, 16D, 16E, 16F, 16G and 16H is the mechanical-chemical principle which this invention utilizes in reaching the efficiencies produced in this invention. The versatility of the machine is also realized by the use of an open grill-like receiving matrix of heating bar members serving as the basic heating elements. Any shape or form of plastic material can be extruded because of the absence of a confining preshaped chamber for holding the plastic material and thus variegated forms of plastic material can be extruded in a continuous manner.

Materials of any shape or form that are difficult to handle in conventional extruders can be extruded into a more dense and usable form by use of this invention. The savings in energy is obvious by the usage of such a machine since the heat requirement is substantially diminished by the use of the proximity heating process described herein. This, in turn, results in less of a need for heavy equipment to be used in conjunction with the machine. Another distinct advantage of this machine is that there are relatively fewer moving parts required because of the inherent nature of the system. These features, coupled with the versatility of handling and extruding odd lot materials for recycling results in a significant improvement in the extrusion art.

The foregoing description of the invention is an elaboration of the preferred embodiment and is not to be considered the only embodiment of the invention, as set forth in the following claims.

What is claimed is:

1. A plastic extrusion machine for heating and extruding plastic material comprising in combination:
    a. a base support member having an upper support surface;
    b. a plurality of heating bar members disposed on the upper support surface of the base support member, said heating bar members being movable relative to one another over the upper surface of the upper support member;
    c. heating means disposed in the internal areas of the heating bar members, said heating means serving to furnish the heat to radiate from the bar members and heat the plastic material placed on top of the heating bar members;
    d. means located beneath the base support member to receive the heated plastic;
    e. means affixed to said base support member for locking said movable heating bar members into position;
    f. perforated plate means located immediately between the receiving means and the base support means, said perforated plate means having a plurality of holes disposed uniformly over the entire surface of said perforated plate means for purposes of receiving the amorphous plastic material and rendering said plastic material into strands.

2. A plastic extrusion machine as described in claim 1 in which the longitudinally extending heating bar members are disposed on the upper surface of the base support member in the same horizontal plane.

3. A plastic extrusion machine for heating and recycling plastic as described in claim 1 in which the means affixed to the base support member are rotatably mounted to the upper surface of the base support member.

* * * * *